United States Patent [19]
Paterson et al.

[11] 3,790,417
[45] Feb. 5, 1974

[54] PROCESS FOR PREPARING FIBERBOARD HAVING IMPROVED DIMENSIONAL STABILITY

[76] Inventors: Arthur R. Paterson, Box 414, Chatham Township, County of Morris; Annemarle C. Reimschuessel, 20 Junard Dr., Morristown, both of N.J. 07960

[22] Filed: Dec. 17, 1971

[21] Appl. No.: 209,461

Related U.S. Application Data

[63] Continuation of Ser. No. 780,140, Nov. 28, 1968, abandoned.

[52] U.S. Cl................. 156/62.8, 161/56, 161/170, 161/261, 161/262, 264/113
[51] Int. Cl........................ B29j 5/00, B32b 21/08
[58] Field of Search. 156/62.2, 62.4, 62.8; 161/156, 161/170, 261, 262; 264/112, 113, 122

[56] References Cited
UNITED STATES PATENTS

| | | | |
|---|---|---|---|
| 2,851,730 | 9/1958 | Wilhelmi et al. | 264/113 |
| 3,180,784 | 4/1965 | Meiler | 161/262 |
| 2,680,995 | 6/1954 | Frost et al. | 161/262 |
| 2,409,645 | 10/1946 | Sawyer | 161/156 |
| 2,543,101 | 2/1951 | Francis, Jr. | 264/122 |
| 3,348,991 | 10/1967 | Abell et al. | 156/306 |

*Primary Examiner*—Daniel J. Fritsch
*Attorney, Agent, or Firm*—Arthur J. Plantamura

[57] ABSTRACT

The dimensional stability of fiberboard or hardboard prepared by bonding cellulosic fibers with a thermosetting or thermoplastic resin may be improved by preparing the fiber mat in a layered construction so that one or more layers of thermosetting or thermoplastic resin is applied between layers of resin-treated fiber and subsequently curing or flowing the resin in the layered construction under heat and pressure.

4 Claims, 4 Drawing Figures

INVENTORS
ARTHUR R. PATERSON
ANNEMARIE C. REIMSCHUESSEL

BY Arthur J Plantamura
ATTORNEY

3,790,417

PROCESS FOR PREPARING FIBERBOARD HAVING IMPROVED DIMENSIONAL STABILITY

This is a continuation, of application Ser. No. 780,140 filed Nov. 28, 1968 now abandoned.

BACKGROUND OF THE INVENTION

This invention relates to a process for preparing fiberboard or hardboard having improved dimensional stability when exposed to moisture.

A useful type of fiberboard or hardboard is typically prepared by treating suitable dry fibers with a thermosetting resin, forming the treated fibers into a mat and then pressing and curing the mat to form boards. The fiber is usually cellulosic material, such as wood, which has been softened by steam and mechanically reduced. The thermosetting resin used to bond the fibers is generally an amino resin, such as ureaformaldehyde or melamine formaldehyde although phenolic resin may also be employed.

Because this type of fiberboard or hardboard is useful primarily as building material, it is important that it be dimensionally stable. In particular, it should not warp or swell on exposure to moisture nor should it shrink excessively when exposed to dry conditions.

It is an object of this invention to provide a method of preparing fiberboard or hardboard having improved dimensional stability with respect to moisture absorption or desorption.

It is another object of the invention to provide an improved fiberboard or hardboard which has improved dimensional stability to moisture and which is characterized by a layered construction wherein at least one layer of resin is interleaved between mats of fiber.

Additional objects and advantages will become apparent from the specification and claims which follow and from the drawing herein:

SUMMARY OF THE INVENTION

This invention provides an improved process for preparing fiberboard or hardboard of the type wherein fine cellulosic fibers are bonded with a thermosetting resin. The improvement specifically comprises interleaving layers of thermosetting resin between mats of the fibers to be bonded prior to curing the board under heat and pressure.

"Fiber" of the kind contemplated for use in preparing fiberboard or hardboard of the present invention is to be distinguished from other wood particles used to make various other boards using relatively large particles, e.g., strands or splinters as well as from relatively coarse particles, variously termed clips, flakes, shavings, etc., used to make particle-board or flakeboard. This "fiber," as used herein, contemplates fine fiberlike threads whose length to diameter ratio ranges from about 3:1 to about 15:1, more than 95 percent of which pass through a six mesh screen and more than 50 percent through a 30 mesh screen as distinguished from the relatively massive splinters or strands described for example in U.S. Pat. No. 3,202,743 or flakes used in flakeboard, essentially none of which passes a 30 mesh screen.

An advantage of the present invention is that it is readily adaptable to the typical commercial dry process for preparing fiberboard or hardboard.

DETAILED DESCRIPTION

Figure 1:
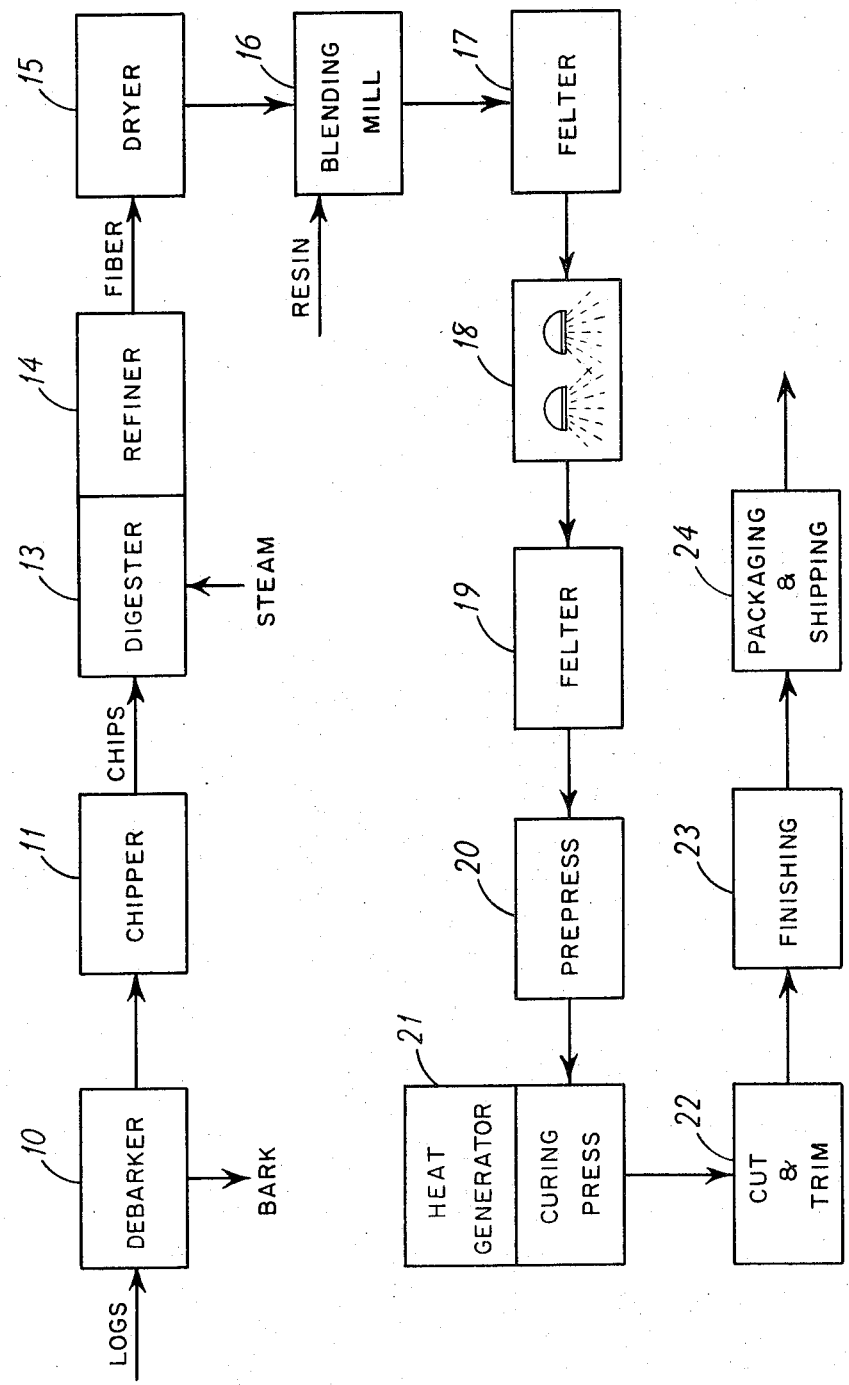
FIG. 1 is a flow sheet depicting schematically the process.
Figure 3:
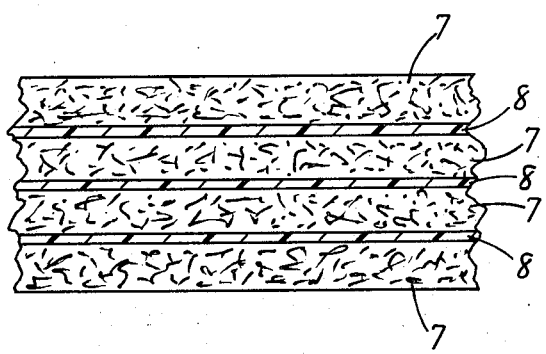

In the typical commercial process as shown in FIG. 1, wood chips produced at 11 from logs debarked at 10 are softened with steam in digester 13 and then mechanically reduced in the refiner 14 to fibers, sometimes while still under steam pressure. Following this stage of the process, the fibers are moist and must usually be dried at 15 and are then preferably pretreated with a binder resin at 16 before forming a mat by felter apparatus 17. The felter 17 may be one of several arranged in alternating sequence with sprayers 18 to form a series of superimposed mats with layers of resin interleaved. Only two felters 17 and 19 and one sprayer 18 are depicted in FIG. 1 but it will be apparent that any suitable number of felters and sprayers may be arranged to produce the desired product. For example a layered construction as shown in FIG. 3 would employ four felters and three spraying stages. Alternately in lieu of felters 17 and 19 any suitable fiber compacting and mat forming arrangement such as those disclosed in U.S. Pat. application, Ser. No. 779,925, Paterson et al., entitled "Improved Fiber Hardboard," filed on even date herewith now abandoned, may be employed. As formed, each of the fiber mats may be subjected to a prepress or material compacting operation before it is assembled with the resin layers into the layered construction, or the entire assembly may be stacked before it is subjected to an initial prepress at 20 and then cured in a final heat and pressure at 21. After being trimmed and cut at 22 and finished at 23 the product is ready for distribution at 24. A suitable process, wherein the fibers may be treated while still moist comprises spraying moist fibers with a pretreatment resin. The resin is then partially cured as the fibers are dried for example, as disclosed in pending U.S. Pat. application of Cleek et al., Ser. No. 757,457, filed Sept. 4, 1968, entitled "Process for Preparing Fiberboard having Improved Dimensional Stability," now abandoned. The present invention is thus seen to involve essentially interleaving a layer of resin between layers of fiber mats followed by curing the layered construction into a unitary board. The boards so prepared have greater strength and substantially improved stability against change in dimensions when exposed to moisture, e.g., warpage, than boards which do not have the layered construction.

The amount of resin applied to the fibers may vary within fairly broad limits with practical considerations usually governing. After being dried, the fiberboard should contain for preferred results from about 2 to about 15 percent resin based on the dry weight of the fibers, of cured resin solids. Boards prepared from fibers containing less than about 2 percent usually suffer by way of lower cohesiveness; with more than about 15 percent resin solids, on the other hand, the board tends to become unduly solid and expensive for most applications. The amount of resin applied to the fibers whether in the pretreatment step or in the interleaved layer of resin may be controlled by varying the solids contents of the resin and intensity of the spray during the respective steps.

The interleaved layer may be the same as or different from the resin employed as binder for the fiber. The thickness of the resin layer interleaved between layers of fiber, depending on the ultimate market for the board and practical considerations, may vary within a fairly broad range, e.g., from about 0.01 inch to about 0.1 inch.

The binder resin used to bond the fiber particles as well as the resin used between fiber layers may be any resin normally employed in forming fiberboard or hardboard. In practice, amino resins, such as urea-formaldehyde, melamine-formaldehyde, or mixtures of these, as well as phenol-formaldehyde, epoxy and polyurethane resins may be used. The preparation of a typical binder resin is described in the examples.

Figure 2:
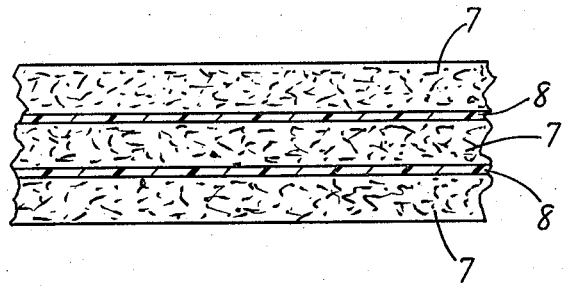
FIGS. 2, 3 and 4 illustrate in cross-section fiberboard having layered construction, i.e. a layer of resin interleaved between layers of fiber.
Figure 4:
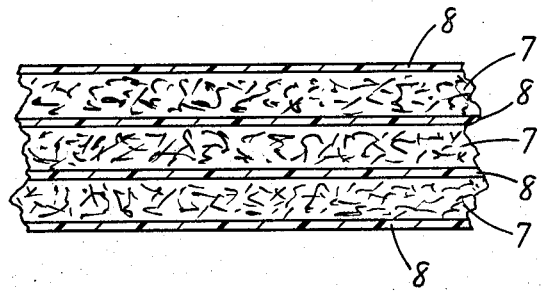

The following examples further illustrate the invention in which fiberboards of layered constructions of the type depicted in FIGS. 2, 3 and 4 are prepared and in which the reference numeral 8 depicts the resin layer and numeral 7 the fiber mat. All parts are by weight unless otherwise indicated.

EXAMPLE I

Chips of mixed hard woods and about 10% pine were defibrated in a steam pressurized Bauer digester-refiner. As the fibers emerged from the refiner they had a moisture content of about 50 percent and were sprayed with a phenol-formaldehyde thermosetting resin containing about 30 percent solids to give a resin solids application of about 3 percent on the fibers. The resin was prepared by reacting phenol and formaldehyde in a 1:2 mole ratio in the presence of about 15 percent sodium hydroxide, based on the weight of phenol, to a 25°C. water tolerance of 250 percent.

The fibers were dried to a moisture content of about 5 percent, then treated with a melamine-urea-formaldehyde resin having a solids content of about 50 percent to give a resin solids application of about 10 percent. The resin was prepared by reacting a. 100 parts of a prepared solution of 60 parts formaldehyde, 25 parts urea and 15 parts water,
b. 19.5 parts urea,
c. 31.1 parts melamine, and
d. 73 parts water at about 160°F. for about 10 minutes, cooling the solution rapidly to about 85°F. and catalyzing it with 1.5 parts ammonium sulfate.

The fiber treated with the binder resin was formed into an endless mat in a sequence of steps. By an alternating series of felters and sprayers, a fiber layer of about 1.5 inches was formed, followed by a resin layer or film of the melamine-urea-formaldehyde sprayed thereon at a thickness of about 0.03 inch, followed again by a second fiber mat of 3 inches, and then again by a resin layer of urea-melamine-formaldehyde of 0.03 inch and then topped by a third fiber mat of 1.5 inches. To aid in observing the uniformity and integrity of the interleaved resin layer, a green dye was added to the resin being sprayed. The composite of superimposed alternate layers of fiber mats and resin layers was prepressed to a thickness of about 4 inches in a caterpillar type press, and then compressed and heated between platens in a hydraulic press to form boards having a thickness of about five-eighths inch and a density of about 38 lbs/cu. ft. The temperature of the platens was about 260°F. A high frequency electric field was used to generate the necessary heat. The resin cured in about 2 minutes.

The following test was used to determine the dimensional stability of the boards produced.

WARP TEST

1. Cut 18-inch by 3-inch samples. Condition the samples for at least 48 hours at 65% R.H. and 70°F. Using a template, drill three ¼-inch holes in each end of the samples (16 inches on center) so they can be bolted onto ¼-inch metal bars.

2. Bolt samples onto metal bars. Measure space between sample and metal bar with feeler gage.

3. Place specimens in vacuum-pressure vessel and cover with 70°F. water. Pull 25-inch vacuum on vessel for 30 minutes. Pressurize vessel to 75 psig for 60 minutes. (Be sure specimens are completely submerged at all times.) Remove specimens and allow to drain for 10 minutes. Remeasure space between sample and metal bar.

4. Seal saturated specimens in polyethylene bag and remeasure space between sample and metal bar after 3 and 7 days.

5. Calculation is as follows:
Warpage equals final deflection (steps 3 or 4) minus initial deflection (step 2).

The sample of fiberboard prepared according to Example I warped and the space between the metal bar and the sample was measured and found to have increased by 0.90 inch after 3 days and 0.11 inch after 7 days in a sealed polyethylene bag.

A control on the other hand wherein an equivalent quantity of resin was used, but distributed as the pretreatment and binder resin with no alternating layering of resin and fiber, gave the following results in the Warp Test: the space between the sample and the bar increased by 0.21 inch after three days and 0.35 inch after seven days.

EXAMPLE II

The procedure of Example I was followed except that the same melamine-urea-formaldehyde was used both as the pretreatment and binder resin as well as the layering resin, and was applied to the fibers to give a resin solids application of about 2 percent as the pretreatment resin, about 6 percent as the binder resin and about 6 percent as the layering resin, to give a total solids content of about 14 percent including the sprayed resin layers.

In the Warp Test, the initial deflection was 0.10 inch after 3 days and 0.12 inch after 7 days compared to the deflection for the control of 0.21 inch and 0.29 inch, respectively.

It will be understood that the several details provided herein so that the invention may be more fully understood are illustrative only. Various modifications which fall within the scope and spirit of the invention will be apparent to those skilled in the art. Accordingly the invention should be limited only by the scope of the claims which follow.

We claim:

1. A process for preparing boards selected from the group consisting of fiberboard and hardboard, said process consisting essentially of interleaving between layers of resin-impregnated cellulosic fibers at least one layer consisting essentially of a thermosetting resin to form a composite of resin and said resin-impregnating fiber layers, and curing the composite under heat and pressure into an integral board.

2. The process of claim 1 wherein the thermosetting resins are selected from the group consisting of amino resins and phenolic resins.

3. The process of claim 1 wherein the total thermosetting resin applied to the fibers and forming the interleaved resin layers comprises from about 2 per cent to about 15 per cent of the total weight of the composite.

4. The process of claim 3 wherein the proportion of the resin used in bonding the fiber as distinguished from the resin in the interleaved layer is less than 40 per cent of the total weight of resin in the board.

* * * * *